Oct. 24, 1939.   F. E. HARRELL ET AL   2,176,871
VENTILATED CAST ROTOR
Filed Jan. 2, 1937   4 Sheets—Sheet 1
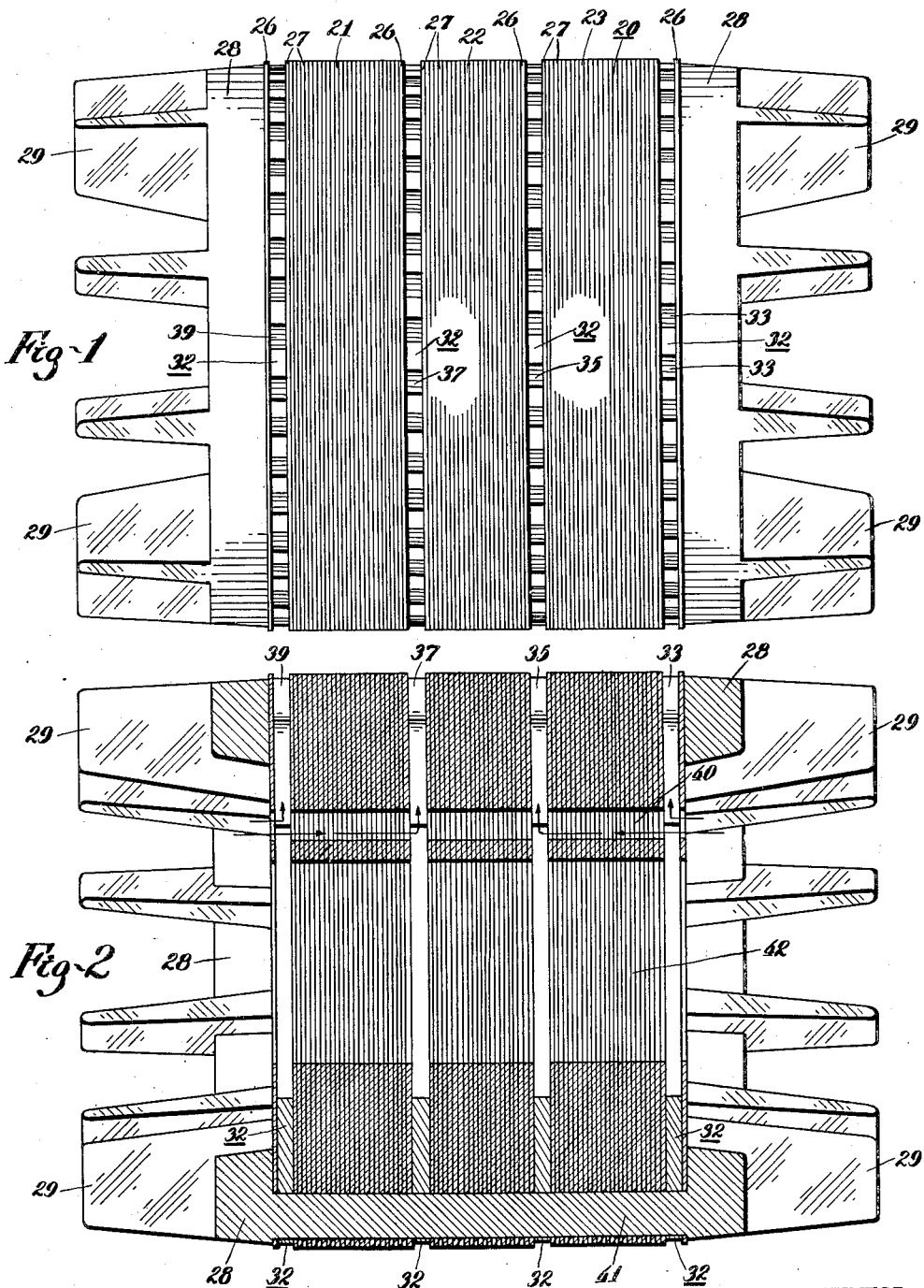
INVENTOR.
Fred E. Harrell
BY Frank S. Dobric
Hoodling and Krost. ATTORNEY.

Oct. 24, 1939.   F. E. HARRELL ET AL   2,176,871
VENTILATED CAST ROTOR
Filed Jan. 2, 1937   4 Sheets-Sheet 2
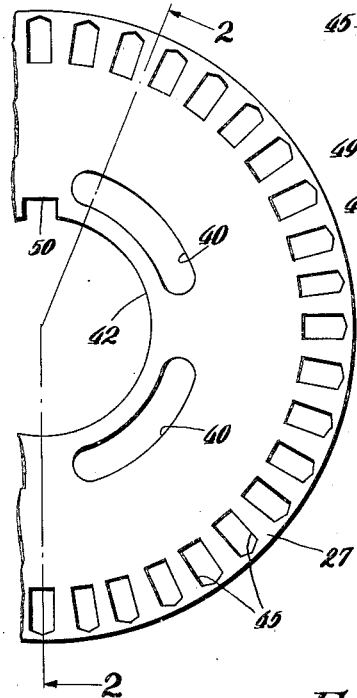
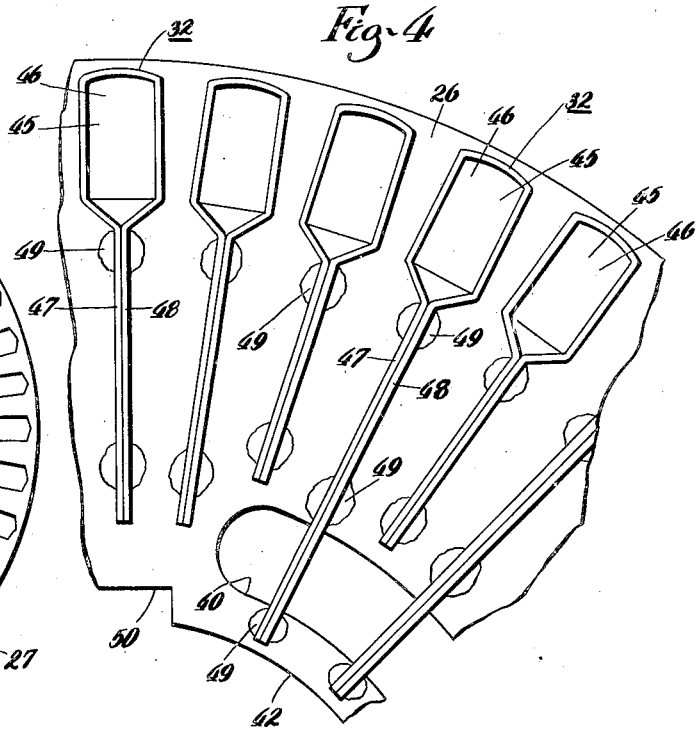
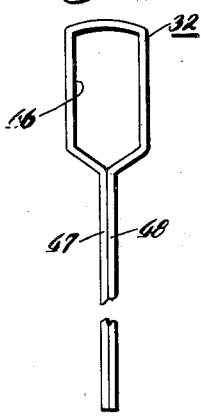
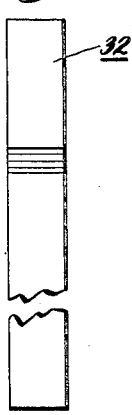
INVENTORS
Fred E. Harrell
BY Frank S. Dobric
Woodling and Krost ATTORNEYS Oct. 24, 1939.　　F. E. HARRELL ET AL　　2,176,871
VENTILATED CAST ROTOR
Filed Jan. 2, 1937　　4 Sheets-Sheet 3
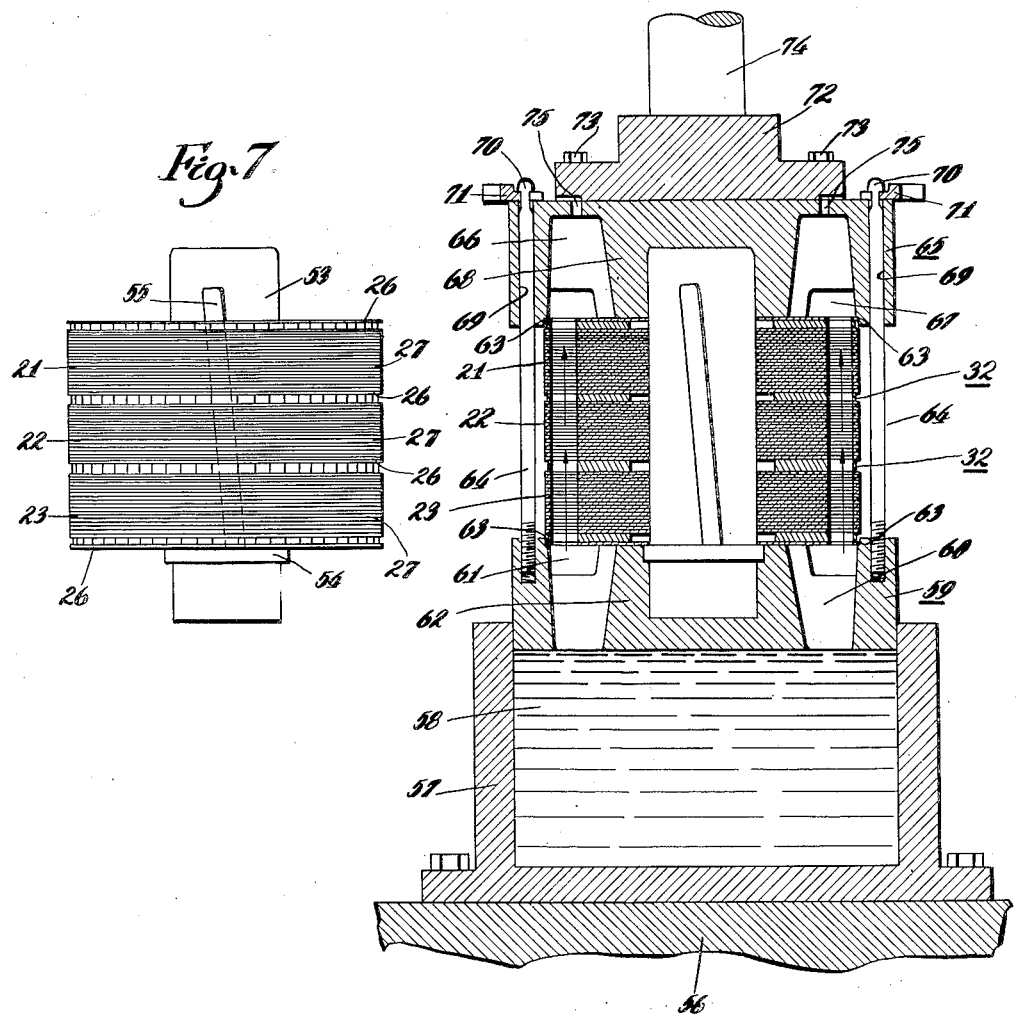
INVENTORS
Fred E. Harrell
BY　Frank S. Dobric
Woodling and Krost　ATTORNEYS Oct. 24, 1939.  F. E. HARRELL ET AL  2,176,871
VENTILATED CAST ROTOR
Filed Jan. 2, 1937  4 Sheets-Sheet 4
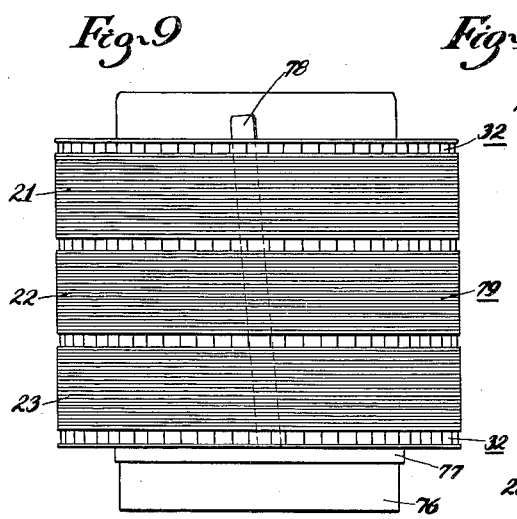
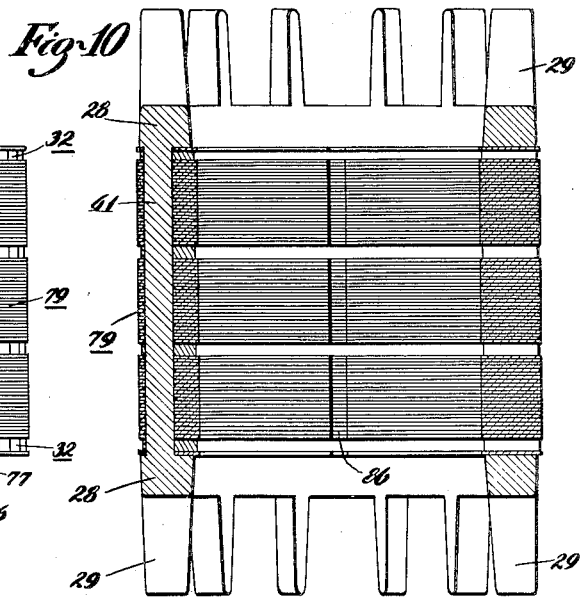
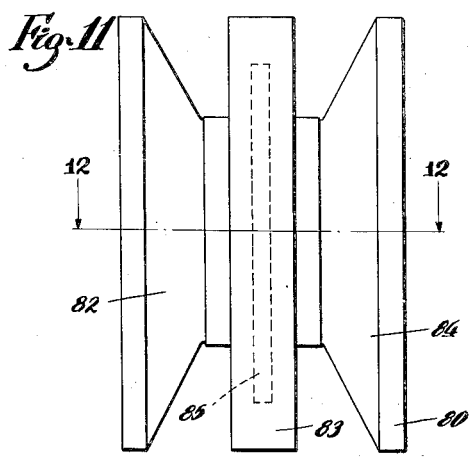
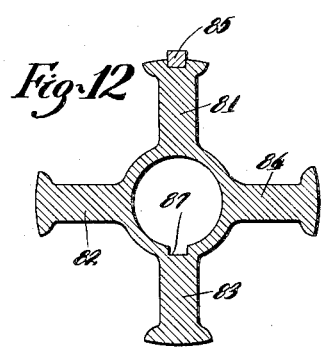
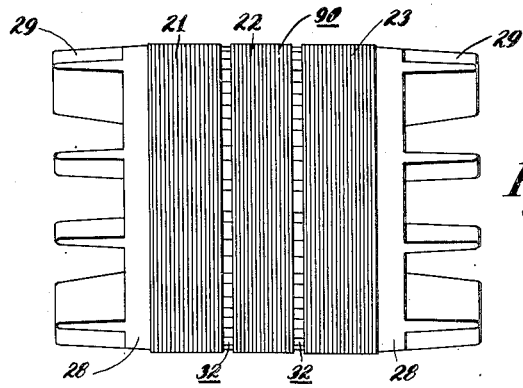
INVENTOR.
Fred E. Harrell
BY Frank S. Dobric
Woodling and Krost ATTORNEY.

Patented Oct. 24, 1939

2,176,871

UNITED STATES PATENT OFFICE 2,176,871

VENTILATED CAST ROTOR

Fred E. Harrell and Frank S. Dobric, Cleveland, Ohio, assignors to The Reliance Electric & Engineering Company, Cleveland, Ohio, a corporation of Ohio Application January 2, 1937, Serial No. 118,898

2 Claims. (Cl. 172—120)

Our invention relates, in general, to squirrel cage rotors and more particularly to ventilated cast squirrel cage rotors and the process for making same.

An object of our invention is the provision of a cast squirrel cage rotor having radial ventilating ducts and continuous conductor bar slots extending from one end of the core to the other.

Another object of our invention is the provision of a ventilated cast squirrel cage rotor having spaced laminated sections, and spacers having openings through which the conductor bars extend across the space between said spaced laminated sections.

Another object of our invention is the provision of a ventilated cast squirrel cage rotor having radial ventilating ducts and cast conductor bars extending across said ventilating ducts.

Another object of our invention is to provide for ventilating the short circuiting rings of a cast squirrel cage rotor.

Another object of our invention is the provision of a ventilated cast squirrel cage rotor having integrally cast conductor bars, short circuiting rings, and fan blades, said rotor also having radial ventilating ducts for ventilating the cast conductor bars and the short circuiting rings.

A still further object of our invention is the provision of a ventilated cast squirrel cage rotor having spaced laminations and cast conductor bars extending across the space between said laminations.

Another object of our invention is the provision of a ventilated cast squirrel cage rotor having a plurality of laminated spaced sections with aligned conductor bar slots, and spacers located between and arranged to separate said laminated sections, each of said spacers having an opening registering with each aligned conductor bar slot to bridge the space between said sections and to make continuous conductor bar slots from one end of the core to the other.

Another object of our invention is the provision of a ventilated cast squirrel cage rotor having a plurality of spaced laminated sections and continuous conductor bar slots extending from one end of the rotor to the other, a portion of the length of said continuous slots constituting openings in spacers located between and arranged to separate said laminated sections.

It is also an object of our invention to provide a spacer for separating the laminations of a cast squirrel cage rotor to provide radial ventilating ducts, said spacer having an enclosed conductor bar slot portion to bridge the space between said lamination.

A still further object of our invention is the provision of a spacer for separating the laminations of a ventilated cast squirrel cage rotor to provide radial ventilating ducts, said spacer being constructed from a strip of material having its ends bent upon themselves and having its central portion forming an enclosed loop through which the conductor bars extend across the space between said spaced laminations.

Another object of our invention is the provision of a spacer for separating the laminations of a ventilated squirrel cage rotor to provide radial ventilating ducts, said spacer comprising an enclosed conductor bar slot portion to bridge the space between said laminations and a longitudinal portion disposed substantially radially inwardly of said enclosed conductor bar slot portion.

Other objects may be had by referring to the following description and claims, taken in conjunction with the accompanying drawings, in which like parts are designated by like reference characters, and in which:

Figure 1 is a side elevational view of a ventilated cast squirrel cage rotor embodying the features of our invention;

Figure 2 is a cross sectional view of our ventilated squirrel cage rotor, taken along a line coinciding with the line 2—2 of Figure 3;

Figure 3 is a fragmentary view of a lamination of our ventilated cast squirrel cage rotor;

Figure 4 is an enlarged fragmentary view of a lamination provided with spacers having openings registering with each of said conductor bar slots;

Figure 5 is a front view of a spacer having an opening through which a conductor bar is arranged to extend.

Figure 6 is a side view of the spacer shown in Figure 5;

Figure 7 illustrates the laminations and the spacers assembled upon a shaft type mandrel preparatory to the casting operation;

Figure 8 shows a cross sectional view of the assembled laminations and spacers, positioned in a mold for casting the conductor bars, the short circuiting rings, and the fan blade;

Figure 9 shows a view similar to Figure 7, except that the laminations and spacers are arranged upon a spider type mandrel;

Figure 10 shows a cross sectional view of a ventilated cast squirrel cage rotor as cast from the laminations and spacers in Figure 9;

Figure 11 shows a plan view of a spider core over which the ventilated cast squirrel cage core in Figure 10 is arranged to be pressed;

Figure 12 shows a cross sectional view of the spider core, taken along the line 12—12 of Figure 11; and Figure 13 shows a side elevational view of a modified ventilated cast squirrel cage rotor embodying the features of our invention, and being similar to Figure 1, except that there are no radial ventilating ducts adjacent the inside edges of the short circuiting rings.

Our ventilated cast squirrel cage rotor is indicated by the reference character 20 in Figure 1 of the drawings, and comprises a plurality of spaced laminated sections 21, 22, and 23 assembled between the integrally cast short circuiting rings 28 having fan blades 29. As illustrated, the plurality of spaced laminated sections 21, 22, and 23, and the short circuiting rings 28 are separated by a plurality of radially disposed spacers 32 to provide radial ventilating ducts for ventilating the cast rotor. Beginning at the right in Figure 2, with particular reference to the upper half of the cast rotor, which is taken along a section line intermediate the spacers 32, see, Figure 3, the radial ducts between the spacers 32 and intermediate the laminated section 23 and the right hand short circuiting ring 28 are designated by the reference character 33; the radial ducts between the spacers 32 and intermediate the laminated sections 22 and 23 are indicated by the reference character 35; the radial ducts between the spacers 32 and intermediate the laminated sections 21 and 22 are indicated by the character 37, and the radial ducts between the spacers 32 and intermediate the laminated section 21 and the left hand short circuiting ring 28 are indicated by the reference character 39. The lower half of the cast rotor in Figure 2 is taken along a section which cuts a spacer 32 longitudinally of its length, but slightly to the right of its center as indicated in Figure 3, so as not to pass through the joining surfaces of the spacer. In the lower half of the cast rotor in Figure 2, the conductor bar 41 and the spacers 32 are shown in cross section.

The longitudinal spacing of the radial ventilating ducts 33, 35, 37, and 39 are arranged to match the stator ducts (not shown) so that the air, which is drawn in from the ends of the rotor and through the longitudinal openings 40 and thence up through the radial ventilating ducts, is expelled radially into the companion stator ducts to the outside of the motor. In this manner, the stator is cooled and ventilated as well as the rotor. The air entering the longitudinal openings 40 from each end of the cast rotor may flow, as indicated by the arrow lines in Figure 2. Thus, the air which enters the longitudinal openings 40 from the right-hand end of the rotor may divide, part going outwardly through the plurality of radial ventilating ducts 33 and part going longitudinally inwardly through the longitudinal openings 40 and thence outwardly through the plurality of radial ventilating ducts 35. The air which enters the longitudinal openings 40 from the left-hand side of the rotor may divide, part going outwardly through the plurality of radial ventilating ducts 39 and part flowing longitudinally inwardly through the longitudinal openings 40, and thence outwardly through the plurality of radial ventilating ducts 37. As a result, the rotor is well ventilated and the heat generated is readily dissipated, which means that the rotor for a certain load may be operated at a lower temperature than would be the case with insufficient ventilation. It is to be particularly observed that the short circuiting rings 28 of the rotor are completely ventilated all around. This materially reduces the operating temperature for a definite load upon the motor. The operating temperature is further reduced by the integrally cast fan blades 29 to the short circuiting rings 28, because of the increased radiating area. The fan blades also force the air out radially through the coil heads of the stator (not shown) and this still effects a further reduction in the operating temperatures of the stator coils.

Prior to the assembly of the laminated core of the rotor, the spacers 32, see Figure 4, may be attached, as for example, by spot welding indicated by the reference character 49, to a special or relatively thick lamination indicated by the reference character 26. In actual practice, for certain sizes of rotors, the special laminations 26 may be of number 22 gauge material, and the regular laminations 27 which make up the body of the laminated sections 21, 22, and 23 may be of a number 26 gauge material. However, it is not to be understood that the applicants are limited to the foregoing thicknesses of laminations, because other thicknesses may be employed depending upon the design and operating conditions of the rotor. The regular laminations 27 and the special laminations 26, as indicated in Figures 3 and 4, may be provided with a plurality of conductor bar openings or slots 45, in which are subsequently cast the plurality of conductor bars 41. The arrangement of the sizes and shapes of the said conductor bar slots or openings 45 may be varied to accommodate any particular design, and it is understood that the detail of the conductor bar slots or openings need not be restricted to the size and shape indicated by the reference character 45 in the drawings, but may be any other detail involving the best design for each particular operating condition.

Also as illustrated in Figure 3, there are four longitudinal openings 40 which conduct the air longitudinally inwardly of the assembled laminations to distribute the air out radially through the plurality of ventilating ducts 33, 35, 37 and 39. The regular laminations 27 as shown in Figure 3, and the special laminations 26 shown in Figure 4, are arranged to be pressed upon a shaft, and thus are provided with an axial shaft opening 42 and a key-way slot 50.

The spacers 32 may be made in any suitable manner, and as illustrated, may be constructed from a strip of material having its end 47 and 48 bent upon themselves and having its central portion bent to form a loop to give a conductor bar opening 46, which opening is arranged to register with a conductor bar slot or opening 45 of the laminations. Thus, it is observed that a spacer is comprised of two principal parts; one, an enclosed conductor bar slot portion which is in the form of the loop, and two, a longitudinal portion comprising the ends 47 and 48 disposed substantially radially inwardly of said enclosed conductor bar slot portion. The arrangement of the size and shape of the said spacers, particularly the size and shape of the conductor bar openings 46 and the length of the longitudinal portion 47 and 48 may be varied to accommodate any particular design, and it is understood that the detail of the spacers need not be restricted to the shape indicated by the reference character 32 in the drawings, but may be of any other detail involving the accomplishment of a good design to suit any particular operating condition. The length of the longitudinal portions 47 and 48 may be arranged to give the greatest strength to the spacing of the laminated sections 21, 22, 23, and the short circuiting rings 28, while at the same time effecting the greatest distribution of ventilation to the plurality of radial ventilating ducts 33, 35, 37, and 39. Accordingly, as illustrated in Figure 4, some of the spacers 32 have foreshortened end portions 47 and 48 in order to clear the longitudinal openings 40, and other spacers have lengthened longitudinal portions 47 and 48 which extend across the longitudinal openings 40 and are spot welded as indicated by the reference character 49 to the special lamination at a place near the shaft opening 42. This gives rigidity, as well as affording complete distribution of the air through the longitudinal openings 40 and the plurality of radial ventilating ducts 33, 35, 37 and 39.

After the regular laminations 27 are stamped and after the special laminations 26 are stamped and provided with the spacers 32, the said laminations are assembled on a mandrel 53 having a shoulder 54 as indicated in Figure 7. As illustrated, the mandrel 53 is provided with an inclined key 55 in order to give a fixed skew to the alignment of the conductor bar slots or opening 45. After the regular and special laminations are properly assembled upon the mandrel 53, the next major operation is to mount the assembled laminations and the mandrel into the mold arrangement as shown in Figure 8, preparatory to the casting operation.

The casting operation may be accomplished by any suitable arrangement, and as indicated, the assembled laminations upon the mandrel are arranged between a lower mold 59 and an upper mold 65 which are fastened together by vertical connecting rods 64. The lower mold 59 has a smooth outer surface and is arranged to fit snugly, but freely, into a cylinder 57 containing molten metal 58. The cylinder 57 may be suitably mounted upon the stationary support 56. The cavities 60 for forming the fan blades 29 are arranged between the inside surface of the outer wall of the lower mold 59 and the outside surface of the central portion 62, into which is positioned the lower end of the mandrel 53. The concentric space for forming the short circuiting ring 28 in the lower mold is indicated by the reference character 61. The upper mold 65 is similar in construction to the lower mold 59, and comprises a plurality of similarly constructed fan blade cavities 66 and a concentric space 67 into which the short circuiting ring is formed. The central portion 68 of the upper mold is provided with a suitable opening to receive the upper end of the mandrel 53. In actual operation, the upper mold 65 is attached by the bolts 73 to a flange plate 72, which is in turn carried by a hydraulically operated ram 74. As shown each of the fan blade cavities 66 at its upper end is provided with an air opening 75 to allow the air to escape during the molding operation, as the molten metal rises in the molds. The inside peripheral edge of the outer wall of the lower and the upper molds are each provided with a peripheral notch 63 in which the peripheral edge portion of the end laminations closely fit.

The assembly of the laminations within the lower and upper molds may be explained as follows: First, let it be assumed that the upper mold 65 is attached to the hydraulically operated flange plate 72 by means of the bolts 73. The next operation is to insert the lower mold 59 into the cylinder 57 without the molten metal 58 within the cylinder, in which case the lower mold 59 rests upon the bottom of the cylinder 57. Then, the assembled laminations upon the mandrel 53 are positioned in the lower mold, after which the hydraulically operated piston ram 74 is gradually lowered, at the same time guiding the vertical rod 64 into the vertical openings 69 of the upper mold. The upper mold 65 is gradually lowered until the assembled laminations are tightly pressed between the lower and upper molds. Then the operator inserts the stepped hook plates 71 about the reduced portion of the vertical rods 64 under the heads 70. Each of the stepped hook plates 71 has an elongated slot which straddles the reduced portion of the upper end of the vertical rod 64, and is provided with two different thicknesses, so that the heads 70 may rest upon either thickness to take up all of the clearance between the heads 70 and the upper surface of the upper mold 65 to maintain a good tight engagement of the upper and lower molds against the assembled laminations. After the stepped hook plates 71 are properly positioned under the heads 70, the hydraulically operated ram 74 is raised, carrying along with it the upper mold, the assembled laminations, and the lower molds as a unitary arrangement. The entire assembly is raised and suspended, in actual practice, in the neighborhood of 8 to 12 inches above the upper edge of the cylinder 57, after which the molten metal 58 is ladled into the cylinder 57 immediately preparatory to the casting of the rotor. Just as soon as the molten metal 58 is ladled into the cylinder 57, the hydraulically operated ram 74 is again lowered and forces the lower mold 59 into the cylinder 57. As the lower mold 59 is forced into the cylinder 57, the molten metal is forced up first into the lower fan blade cavities 60 and then into the short circuiting ring space 61, after which the molten metal rises through the conductor bar slots 45 and the openings 46 in the spacers 32. The molten metal continues to rise as the lower mold 59 is forced into the cylinder 57, until the upper short circuiting ring space 67 and the upper fan blade cavities 66 are completely filled. Any air which may be entrapped in the upper end of the upper mold 65 is allowed to escape through the air opening 75. After the molten metal has solidified, the hydraulically operated ram 74 is again raised to withdraw the lower mold 59 and the chilled unused metal 58 which adheres to the lower end of the mold, from the cylinder 57. After the entire assembly is raised to its uppermost position, the unused solidified metal adhering to the lower end of the mold, is first removed by suitable means. After this the cast rotor may be dismantled from the lower and upper molds in substantially the reverse order to which the laminations were mounted in the molds. The finished cast rotor takes the form like that shown in Figure 1 of the drawings.

In general practice, squirrel cage rotors may be mounted either upon a shaft as that shown in Figures 1 to 8, inclusive, or they may be mounted upon spider cores as indicated in Figures 9 to 12, inclusive. The manner of casting a spider type squirrel cage rotor is the same as that previously described with reference to a shaft mounted squirrel cage rotor. In casting a spider type squirrel cage rotor, the first step is to assemble the laminated sections 21, 22 and 23, and the spacer 32 upon a spider mandrel 76 having a shoulder 77 as indicated in Figure 9. The mandrel 76 is provided with an incline key 78 so that the conductor bar slots 45 and the openings 46 in the spacer 32 are skewed. The casting of the rotor for a spider mounting is the same as that described with reference to Figure 8 and a cross-section of a finished rotor is indicated in Figure 9 by the reference character 79. The spider is indicated by the reference character 80 and may comprise four spokes 81, 82, 83, and 84. The spider core 80 has an axial opening to receive a shaft and is also provided with a longitudinal key-way 87.

After the rotor is cast, a longitudinal key slot 86 is cut therein, as shown in Figure 10, and this key slot is arranged to receive the key 85 of the spider spoke 81, when the spider is pressed into the cast rotor. The distribution of the air through the radial ventilating duct of the cast rotor mounted upon a spider core is substantially the same as that explained with reference to cast rotors mounted upon a shaft, except that it is not necessary to have longitudinal openings 40 extending through the laminated sections, since the air may freely circulate between and around the spider spokes.

In Figure 13, we show a modified form of a ventilated cast rotor 90, in that there are no radial ventilating ducts adjacent the inside edge of the short circuiting rings 28. The cost of this rotor may be somewhat less than those having radial ventilating ducts adjacent the short circuiting rings.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. In a squirrel cage rotor having cast conductor bars, of a laminated core comprising a plurality of laminations having aligned conductor bar slots, spacers located between two of said laminations and providing a radial ventilating duct, said laminated core having a longitudinal ventilating duct extending from one end of the core to the other and located radially inwardly of the conductor bar slots, said spacers having an opening registering with each of said aligned conductor bar slots to bridge the space across said ventilated duct, said spacers also having a longitudinal portion disposed substantially radially inwardly of said conductor bar slots and extending across the longitudinal ventilating duct to give rigidity to the core as well as to afford complete distribution of the air through the longitudinal and the radial ventilating ducts.

2. In a squirrel cage rotor having cast conductor bars and an axial shaft opening, of a laminated core comprising a plurality of laminations having aligned conductor bar slots, spacing means located between two of said laminations and providing a ventilating duct, said laminated core having a longitudinal ventilating duct extending from one end of the core to the other and located radially inwardly of the conductor bar slots, said spacing means having an opening registering with each of said aligned conductor bar slots to bridge the space across said ventilated duct, said spacing means also having a longitudinal portion disposed substantially radially inwardly of said conductor bar slots, said spacing means being fastened to one of said laminations at a place between said conductor bar slot and said longitudinal ventilating duct, said spacing means also being fastened to said lamination between the said longitudinal ventilating duct and the axial shaft opening to give rigidity to the core.

FRED E. HARRELL.
FRANK S. DOBRIC.